(12) United States Patent
Prasad et al.

(10) Patent No.: US 7,787,553 B2
(45) Date of Patent: Aug. 31, 2010

(54) GROUP DECODER WITH IMPROVED PARTITIONING FOR MULTIPLE ANTENNA MULTIUSER CHANNEL

(75) Inventors: Narayan Prasad, Plainsboro, NJ (US); Xiaodong Wang, New York, NY (US); Mohammad Madihian, Plainsboro, NJ (US)

(73) Assignee: NEC Laboratories Aemrica, Inc., Princeton, NJ (US)

( * ) Notice: Subject to any disclaimer, the term of this patent is extended or adjusted under 35 U.S.C. 154(b) by 1048 days.

(21) Appl. No.: 11/428,386

(22) Filed: Jul. 1, 2006

(65) Prior Publication Data
US 2007/0004366 A1    Jan. 4, 2007

Related U.S. Application Data

(60) Provisional application No. 60/696,377, filed on Jul. 1, 2005.

(51) Int. Cl.
*H04B 7/02* (2006.01)

(52) U.S. Cl. .................... 375/267; 375/260; 375/259

(58) Field of Classification Search ................ 375/267, 375/260, 259
See application file for complete search history.

(56) References Cited

U.S. PATENT DOCUMENTS

| 6,370,129 | B1* | 4/2002 | Huang ................ 370/329 |
| 6,947,506 | B2* | 9/2005 | Mills ................. 375/346 |
| 7,047,016 | B2* | 5/2006 | Walton et al. .......... 455/452.1 |
| 7,092,452 | B2* | 8/2006 | Taylor et al. ........... 375/267 |
| 2004/0137863 | A1* | 7/2004 | Walton et al. .......... 455/130 |
| 2005/0174983 | A1* | 8/2005 | Naguleswaran et al. ... 370/347 |
| 2005/0185729 | A1* | 8/2005 | Mills ................. 375/267 |
| 2006/0182204 | A1* | 8/2006 | Cairns et al. ........... 375/340 |
| 2006/0233268 | A1* | 10/2006 | Frank et al. ........... 375/260 |

\* cited by examiner

*Primary Examiner*—Shuwang Liu
*Assistant Examiner*—Kenneth Lam
(74) *Attorney, Agent, or Firm*—Joseph Kolodka

(57) ABSTRACT

A group detection arrangement for a multiple antenna receiver structure usable with a multiuser multiple access communication channel with fading is herein disclosed. The group detection arrangement uses an optimized channel dependent group partitioning technique.

9 Claims, 4 Drawing Sheets

GROUP DECODER WITH IMPROVED PARTITIONING FOR MULTIPLE ANTENNA MULTIUSER CHANNEL

CROSS-REFERENCE TO RELATED APPLICATIONS

This application claims the benefit of and is a nonprovisional of U.S. Provisional Application No. 60/696,377, entitled "GROUP DECODER DESIGN FOR MULTIPLE ANTENNA MULTIUSER CHANNEL," filed Jul. 1, 2005, the contents of which are incorporated by reference herein.

BACKGROUND OF INVENTION

The invention relates generally to group decoders for multiple antenna multiuser communication channels.

Multiple access techniques such as code division multiple access (CDMA) allow multiple users to efficiently share limited communication resources. The performance of such multiple access techniques can potentially be further improved by using multiuser detection, in which user signals are jointly detected rather than considered as interfering noise to each other. Unfortunately, optimal multiuser decoding techniques have high decoding complexity which are often infeasible for practical systems. It has been proposed to divide users into groups, where each group is jointly detected based on a decision statistic obtained via zero-forcing operation with or without decision feedback. See M. K. Varanasi, "Group Detection for Synchronous Gaussian Code-Division Multiple-Access Channels," IEEE Transactions on Information Theory, Vol. 41, No. 4 (July 1995). Group detection can potentially relieve the tension between good performance and low detection complexity. More recently, it has been proposed, in the context of sequential group detectors used in an uncoded Gaussian CDMA channel with BPSK modulation, to maximize the asymptotic symmetric energy over all partitions satisfying a maximum group size constraint. See J. Luo et al., "Optimal Grouping Algorithm for a Group Detection Feedback Detector in Synchronous CDMA Communications," IEEE Transactions on Communications, Vol. 51, pp. 341-46 (March 2003). Unfortunately, this metric is not applicable to a fading multiple access channel with random channel fluctuations where users possibly employ outer codes of different rates and different modulation schemes.

The problem of determining the optimal grouping strategy, accordingly, still represents a challenge, in particular as attention shifts to wireless fading multiple access channels where the receiver employ multiple antennas.

SUMMARY OF INVENTION

A group detection arrangement for a multiple antenna receiver structure usable with a multiuser multiple access communication channel with fading is herein disclosed. The group detection arrangement uses an optimized channel dependent group partitioning technique which can be implemented with either sequential or parallel group decoders. The decoder can be tailored to the fading channel using the partitioning rules and stochastic gradient-based power optimization. The disclosed partitioning technique can provide improved performance at the same power level or reduced power at the same performance level.

These and other advantages of the invention will be apparent to those of ordinary skill in the art by reference to the following detailed description and the accompanying drawings.

DETAILED DESCRIPTION

Figure 1:
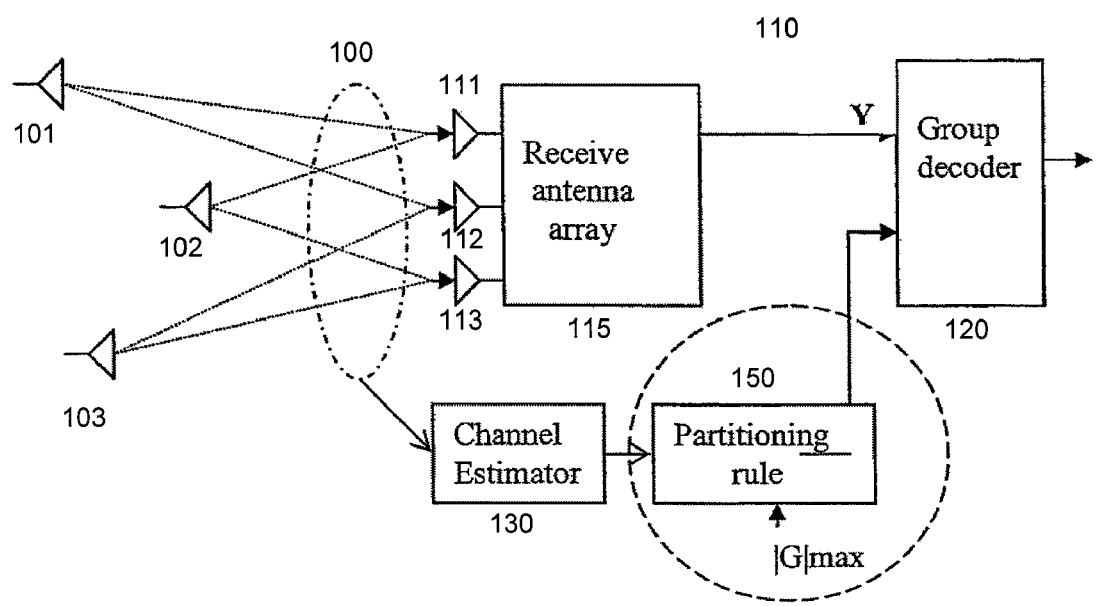
FIG. 1 illustrates a receiver structure in a multiple antenna multiuser communication system, suitable for practice of an embodiment of the invention.

FIG. 1 illustrates a receiver structure employing group decoding in a multiple antenna multiuser communication system, suitable for practice of an embodiment of the invention.

The receiver structure 110 has $N \geq 1$ receive antennas, depicted in FIG. 1 as 111, . . . 113. The receiver structure 110 communicates with K transmitters, depicted in FIG. 1 as 101, . . . 103, across a multiple access communication channel 100. The receiver structure 110, for example and without limitation, can be a base station in communication with multiple user stations, each user structure having one or more transmitters. The receiver structure 110 is assumed to include a group decoder 120. The group decoder 120 is not limited to a specific type of group decoding arrangement and, as further discussed herein, can be a sequential group decoder or a parallel group decoder. The receiver structure 110 also includes some form of channel estimator 130 coupled to a partitioning arrangement 150. The partitioning arrangement 150 is responsible for determining optimal group partitions for the group decoder 120. As further described herein, the decoding complexity can be kept under control by a maximum group size parameter $|G|_{max}$ used by the partitioning arrangement 150. To illustrate, with four users indexed by (1,2,3,4) and maximum group size of $|G|_{max}=2$, there are 42 possible partitions (such as ({1, 2}, {3, 4}), ({3, 4}, {1, 2}), etc. for the sequential group decoder and 9 for the para group decoder. The order of groups in any partition is irrelevant for the parallel group decoder; hence the number of possible partitions is much less. For each channel realization, any partition $\{G_1, \ldots, G_p\}$ of $\{1, \ldots, K\}$ with $|G_k| \leq |G|_{max}$, $1 \leq k \leq p$ is assumed to be feasible, i.e., the resulting decoding complexity is within permissible limits. At any stage no more than $|G|_{max}$ users are decoded jointly.

Rather than resorting to a brute-force search over all partitions, the partitioning arrangement 150 advantageously determines the optimal partition for each channel realization via the following greedy strategy.

1. Among all partitions of K transmitters into two groups $G_1$ and $\overline{G}_1$ with $|G_1| \leq |G|_{max}$ select the one having the highest value of a metric $M_{G_1}$. The metric can be defined in a number of advantageous ways, as illustrated in further detail below.
2. Remove the transmitters in the group $G_1$ and among all partitions of the remaining $K-|G_1|$ transmitters into groups G2 and $\overline{G}_2$ with $|G_2| \leq |G|_{max}$ select the one having the highest value of the metric $M_{G_2}$.
3. Continue the process until all the transmitters are assigned to groups.

Figure 2:
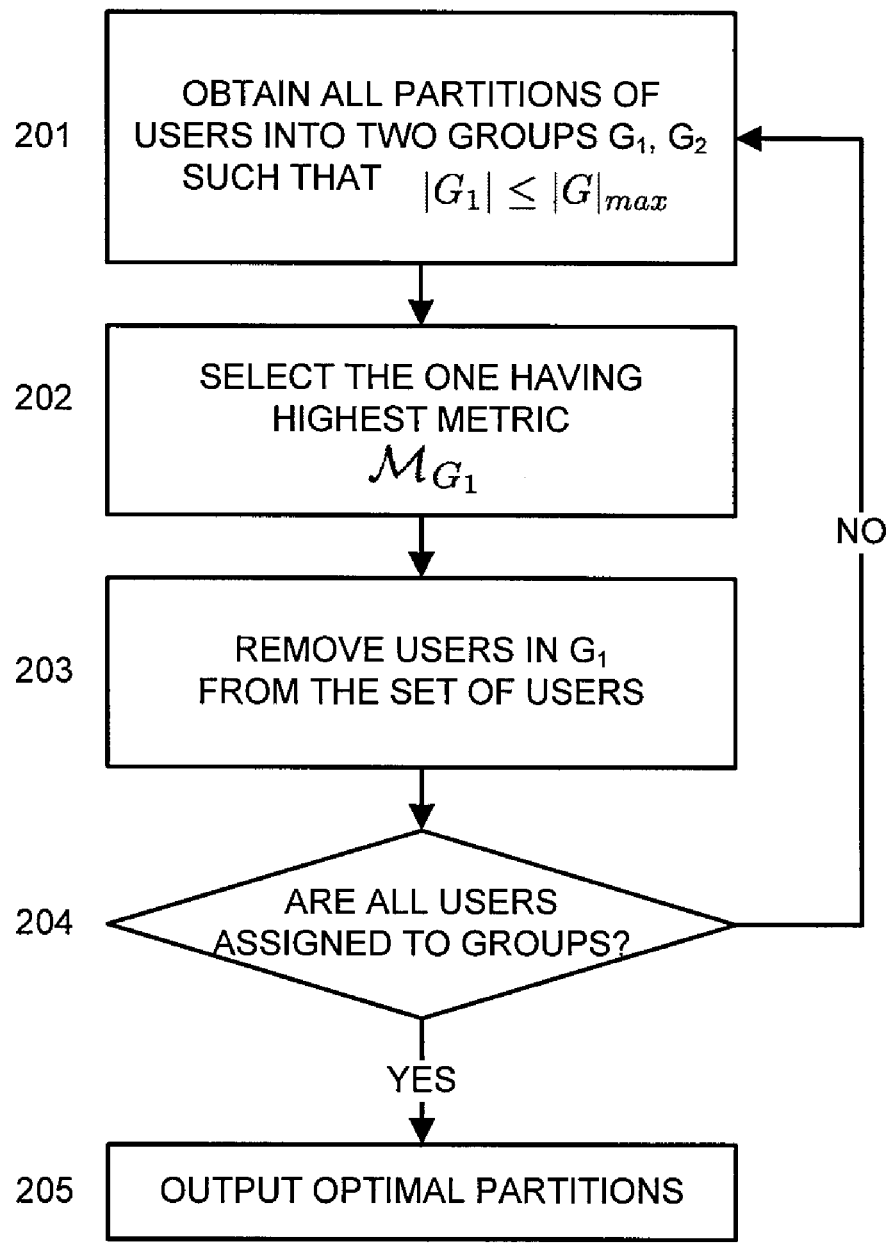
FIG. 2 is a flowchart of processing performed in determining an optimal partitioning for a group decoder, in accordance with a first embodiment.

Note that when $|G|_{max}=1$, the grouping strategy reduces to an optimal ordering technique. FIG. 2 is a flowchart illustrating this greedy strategy which optimizes performance of the group decoder under a fixed complexity constraint (as defined by $|G|_{max}$).

Figure 3:
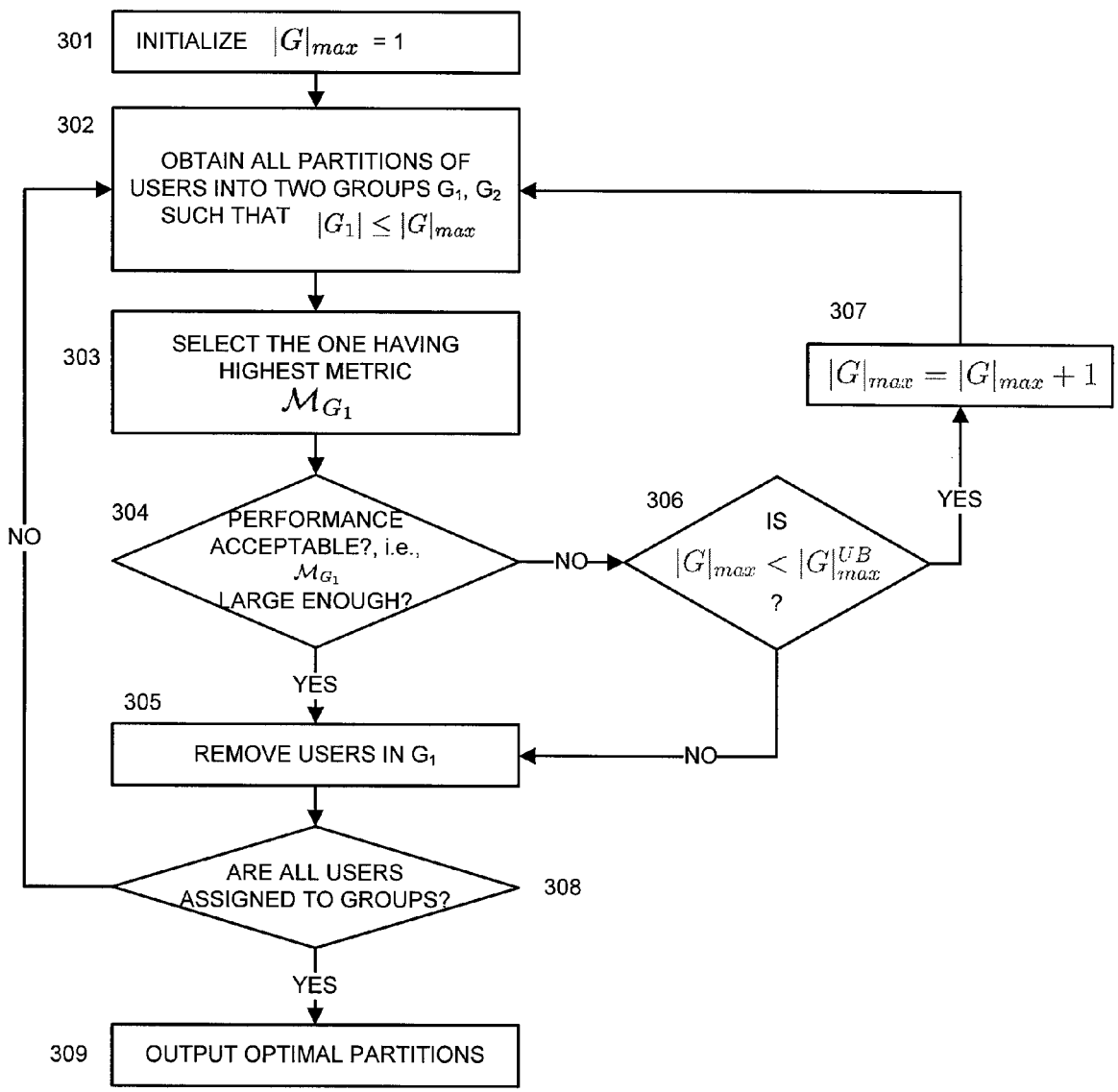
FIG. 3 is a flowchart of processing performed in determining an optimal partitioning for a group decoder using an adaptive complexity constraint, in accordance with a second embodiment.
Figure 4:
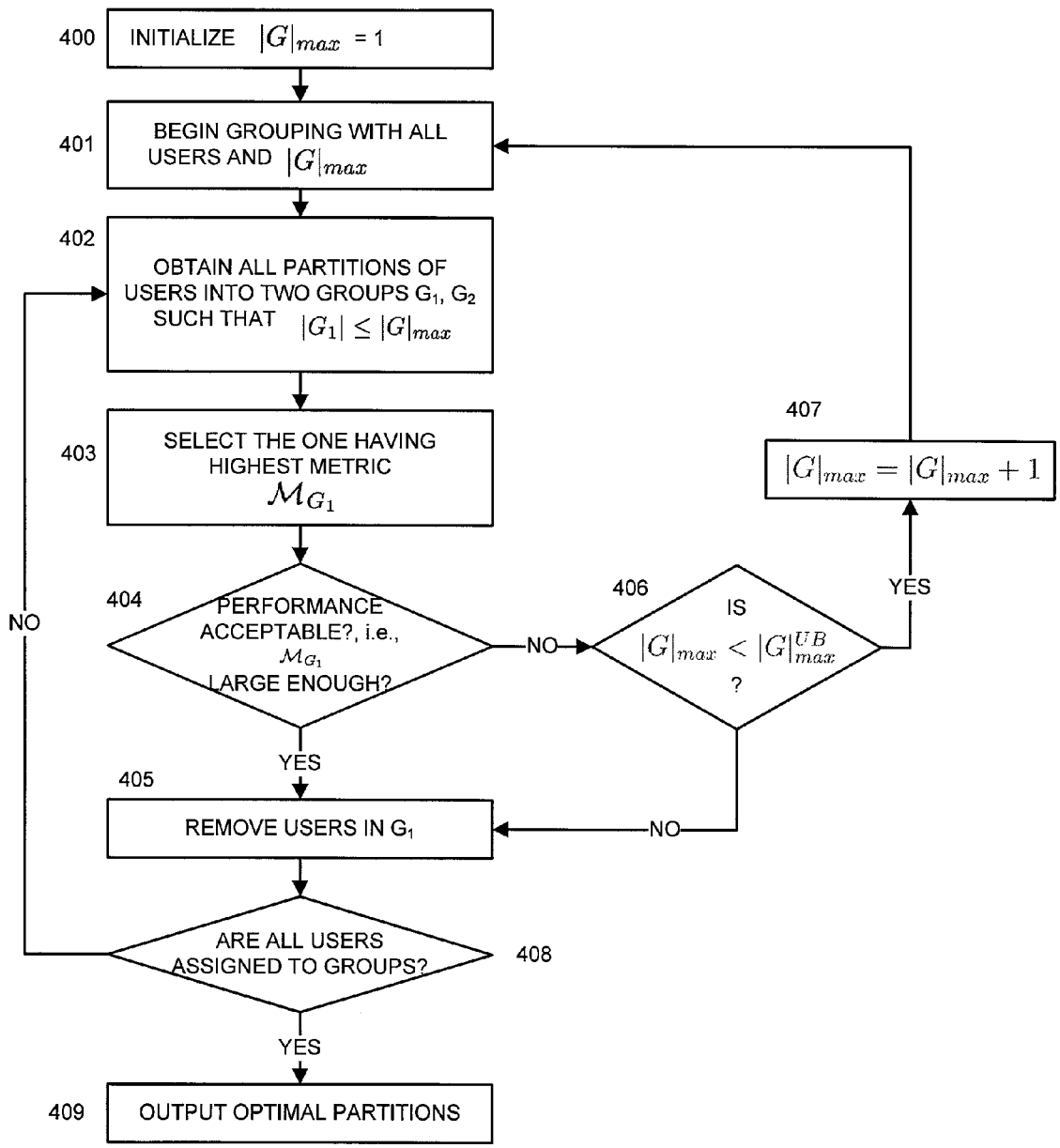
FIG. 4 is a flowchart of processing performed in determining an optimal partitioning for a group decoder using an adaptive complexity constraint, in accordance with a third embodiment.

FIGS. 3 and 4 illustrate two alternative adaptive grouping strategies where even $|G|_{max}$ is channel dependent. The aim of the adaptive strategies is to minimize complexity for each channel realization by choosing the smallest possible $|G|_{max}$ which yields acceptable performance. Let $U_{opt}(\tilde{H},\mu_{max})$ denote the optimal undecodable set yielded by the greedy strategy for channel realization $\tilde{H}$ and maximum group size $\mu_{max}$. Our objective is to achieve the same outage probabilities as those of the optimal greedy strategy with $\mu_{max}=u$ (for some specified u) but with the smallest maximum group size possible. To do so, we leverage the uniqueness of the optimal undecodable set for a given group size. Note that for each realization the minimum group size needed for outage optimality is $$\mu^* = \min\{k : k \leq u \text{ and } U_{opt}(\tilde{H},k)=U_{opt}(\tilde{H},u)\} \quad (1)$$

In either of the two adaptive techniques discussed below, a valid ordered partition having at least one group of size $\mu^*$ in (1) is chosen.

In the first adaptive strategy set forth in FIG. 3, we initiate the greedy strategy of the previous section with group size one. Everytime an outage is encountered, we start afresh, i.e., we start processing all users again after incrementing the current group size by 1. This approach yields the optimal ordered partition corresponding to group size $\mu^*$, without having to pre-compute $\mu^*$. Thus it allows us to achieve the minimum possible outage probabilities, and the maximum error exponent among all ordered partitions valid for $1 \leq \mu_{max} \leq \mu^*$. There is a potential loss in the error exponent of the decodable set compared to that yielded by the optimal ordered partition with $\mu_{max}=u$, but a substantial reduction in decoding complexity makes up for it.

The second adaptive greedy grouping strategy which also retains outage optimality of the one above is set forth in FIG. 4. Here at each stage this approach picks the smallest group size from the set $\{1, \ldots, u\}$ that can avoid outage. In other words, at each step starting from group size 1, the adaptive strategy determines if the best group (in terms of error exponent) of the current group size can avoid outage. If yes, that group is selected and the approach proceeds to the remaining users and resets the initial group size to one. Otherwise the current group size is incremented by one and the process is repeated. The computational cost of determining the ordered partition for this grouping strategy is in general less than that of the first one but its error exponent is also poorer.

An appropriate metric for the above partitioning techniques can be provided by the following outage probability formulation.

The communication channel 100 can be modeled as a slow fading narrowband multiple access channel where the channel output is described as $$Y = HW^{1/2}X + V = \tilde{H}X + V, \quad (2)$$

where Y is the N×J received matrix and the fading is described by the N×K matrix H having independent, identically distributed (i.i.d.), zero-mean, unit variance, complex normal (CN (0, 1)) elements. The random matrix H is assumed to stay constant for J symbol periods (the coherence interval) after which it jumps to an independent value. It is assumed herein that H is known perfectly to the receiver but is unknown to the transmitters. The N×J matrix V represents the additive noise at the receiver and has i.i.d., CN(0, 1) elements. W=diag$\{w_1, \ldots, w_K\}$ is a diagonal matrix of average transmit powers and $$\sum_{k=1}^{K} w_k$$

represents the total average transmit power (per channel use). Note that due to our normalization $$\sum_{k=1}^{K} w_k$$

also represents the average SNR at each receive antenna per channel use. Also, for convenience we absorb W into H and consider $\tilde{H}$ to be the effective fading matrix. The K×J matrix X, henceforth referred to as the frame, can be partitioned as $X=[x_1^T, \ldots, x_K^T]^T$ where the 1×J vector $x_k$ represents the output of the $k^{th}$ user and is transmitted over J consecutive symbol intervals. In particular, the $k^{th}$, $1 \leq k \leq K$ user employs a code $X_k$ with $$M_k \triangleq \lceil 2^{R_k J} \rceil$$

codewords of length J. Further we assume that each one of these $M_k$ hypotheses is equally likely and that the code $$\chi_k = \{x_k^l\}_{l=1}^{M_k}$$

satisfies the average power constraint $$\frac{\sum_{l=1}^{M_k} x_k^l x_k^{l\dagger}}{M_k} \leq J.$$

Also, a collection of K independent codes, consisting of $M_k$, $1 \leq k \leq K$ length J codewords, which satisfy the power constraints will be called as a permissible code. For simplicity, we assume that $N \geq K$ although some of the following results do not require this assumption. Then it can be noted that the rank of H is K with probability one.

Group Decoders with Feedback. First, consider the group decorrelating decision feedback decoder (GD-DFD) which subsumes the decorrelating decision feedback decoder (D-DFD) and the optimum decoder as its special cases. To describe this decoder we will need the following notation. For a given channel realization $\tilde{H}$ and a partition $\{G_1, \ldots, G_p\}$ of $\{1, \ldots, K\}$, let $\tilde{H}_{G_k}$, $1 \leq k \leq p$ denote the matrix formed by columns of $\tilde{H}$ whose indices are in the set $G_k$, respectively. Define $$\tilde{H}_{\bar{G}_k} = [\tilde{H}_{G_{k+1}}, \ldots, \tilde{H}_{G_p}]$$

$$\tilde{P}_{\bar{G}_k^\perp} = I - \tilde{H}_{\bar{G}_k}(\tilde{H}_{\bar{G}_k}^\dagger \tilde{H}_{\bar{G}_k})^{-1}\tilde{H}_{\bar{G}_k}^\dagger, \quad 1 \leq k \leq p-1 \quad (3)$$

and let $\tilde{P}_{\bar{G}_p^\perp}=I$. Further let the projection matrices have the decomposition $$\tilde{P}_{\bar{G}_k^\perp} = \tilde{U}_{\bar{G}_k^\perp}(\tilde{U}_{\bar{G}_k^\perp})^\dagger \quad (4)$$

where the $N \times N - |G_{\bar{k}}|$ matrix $\tilde{U}_{G_{\bar{k}}^\perp}$ satisfies $(\tilde{U}_{G_{\bar{k}}^\perp})^\dagger \tilde{U}_{G_{\bar{k}}^\perp} = I$. Then the decision statistics for the first group $G_1$ is obtained as $$(\tilde{U}_{G_{\bar{1}}^\perp})^\dagger Y = (\tilde{U}_{G_{\bar{1}}^\perp})^\dagger \tilde{H}_{G_1} X_{G_1} + (\tilde{U}_{G_{\bar{1}}^\perp})^\dagger V \qquad (5)$$

The users in $G_1$ are decoded by the optimum decoder which operates on the decision statistic in (5). Once the decisions for users in $G_1$ are obtained they are re-encoded and fed back before decoding the subsequent groups. In particular the decision statistic for the $k^{th}$ group $G_k$ is given by, $$(\tilde{U}_{G_{\bar{k}}^\perp})^\dagger \left( Y - \sum_{j=1}^{k-1} \tilde{H}_{G_j} \hat{X}_{G_j} \right) \qquad (6)$$

where $\hat{X}_{G_j}$ denotes the re-encoded matrix corresponding to $G_j$. The users in $G_k$ are decoded using the optimum decoder on (6) after assuming perfect feedback. Note that when there is just one group of size K, the GD-DFD is identical to the optimum decoder whereas with K groups of size one each, the GD-DFD reduces to the D-DFD.

Next, in order to describe the GM-DFD we first define the following matrices.

$$\tilde{Q}_{G_k} \triangleq (\tilde{H}_{G_k})^\dagger \left( I + \tilde{H}_{G_{\bar{k}}} (\tilde{H}_{G_{\bar{k}}})^\dagger \right)^{-1} \tilde{H}_{G_k} \qquad (7)$$

$$\tilde{F}_{G_k} \triangleq (\tilde{Q}_{G_k})^{-1/2} (\tilde{H}_{G_k})^\dagger \left( I + \tilde{H}_{G_{\bar{k}}} (\tilde{H}_{G_{\bar{k}}})^\dagger \right)^{-1}, \quad 1 \leq k \leq p-1$$

Similar to the GD-DFD, the decision statistic for the $k^{th}$ group $G_k$ is given by, $$\tilde{F}_{G_k} \left( Y - \sum_{j=1}^{k-1} H_{G_j} \hat{X}_{G_j} \right) = \qquad (8)$$

$$\tilde{F}_{G_k} \tilde{H}_{G_k} X_{G_k} + \tilde{F}_{G_k} \left( \sum_{j=1}^{k-1} \tilde{H}_{G_j} (X_{G_j} - \hat{X}_{G_j}) + \sum_{j=k+1}^{p} \tilde{H}_{G_j} X_{G_j} + V \right)$$

The users in $G_k$ are decoded using the optimum decoder on (8) after assuming perfect feedback and the effective noise (i.e. noise plus MAI) to be white.

Next, we obtain the outage probability of the multiple access channel employing the D-DFD for specified rates $R = [R_1, \ldots, R_K]^T$, powers $w = [w_1, \ldots, w_K]^T$, in a fixed order of decoding. We then connect the obtained outage probability to the FEP. The FEP, denoted by $Pr(\epsilon)$, is the probability that not all codewords transmitted in a frame are decoded correctly. This error probability is averaged over the fading, the noise realizations and the choice of the transmitted codewords. Without loss of generality we assume that $G_k = k$, $1 \leq k \leq K$. Next, we invoke the fact that the true FEP (conditional FEP) is identical to the FEP (conditional FEP) of a genie aided D-DFD which enjoys perfect feedback. See M. K. Varanasi, "Decision Feedback Multiuser Detection: A Systematic Approach," IEEE Transactions on Information Theory, Vol. 45, No. 1, pp. 219-40 (January 1999). Thus, we focus on the genie aided counterpart. Note that now $$(\tilde{U}_{G_{\bar{k}}^\perp})^\dagger \tilde{H}_{G_k} = L_{k,k}, \quad 1 \leq k \leq K \qquad (9)$$

where $\{L_{k,k}\}_{k=1}^K$ are the (positive) diagonal elements of the $K \times K$ lower triangular matrix L obtained via the Cholesky decomposition $\tilde{H}^\dagger \tilde{H} = L^\dagger L$. Thus we can write the decision statistics for the genie-aided decoder as $$\tilde{Z}_{k,t}^g = L_{k,k} x_{k,t} + \tilde{V}_{k,t}, \quad 1 \leq t \leq J, 1 \leq k \leq K. \qquad (10)$$

For any realization of $L_{k,k}$ since the channel in (10) is Gaussian and memoryless we have that under the specified power constraint, the instantaneous mutual information (in bits per channel use) denoted by $I_k^g(L_{k,k})$ is maximized by taking $\{x_{k,t}\}_{t=1}^J$ to be independent identically distributed (i.i.d) $CN(0,1)$ so that we set $I_k^g(L_{k,k}) = \log(1 + L_{k,k}^2)$. We now define the outage event O as $$O^c \triangleq \bigcap_{k=1}^K (I_k^g(L_{k,k}) \geq R_k).$$

Note that the complement $O^c$ is given by $$Pr(O) = 1 - Pr(O^c) = 1 - Pr\left( \bigcap_{k=1}^K \{\log(1 + L_{k,k}^2) \geq R_k\} \right) \qquad (12)$$

Then the outage probability is given by, $$O \triangleq \left\{ \bigcup_{k=1}^K \{I_k^g(L_{k,k}) < R_k\} \right\}. \qquad (11)$$

It can then be shown that $\{L_{k,k}^2\}_{k=1}^K$ are independent and that $L_{k,k}^2$ has chi-square density with $$2\mathcal{D}_k \triangleq 2(N - K + k)$$

degrees of freedom so that we have, $$Pr(O) = 1 - \prod_{k=1}^K \left( 1 - F_k\left( \frac{2^{R_k} - 1}{w_k} \right) \right), \qquad (13)$$

where $$F_x(x) = 1 - \exp(-x) \sum_{k=0}^{\mathcal{D}_k - 1} \frac{x^k}{k!}, \quad x \geq 0.$$

The following result can be proved using random coding arguments: For any $\epsilon > 0$, there exists $J_o(\epsilon) > 0$ such that for each $J > J_o(\epsilon)$, there exists a permissible code whose FEP yielded by the D-DFD satisfies $Pr(\epsilon) \leq \epsilon + Pr(O)$. This result shows that the outage probability is indeed achievable.

In order to obtain the optimal power tuple which minimizes the outage probability for a given sum power W and a rate-tuple $R > 0$, we minimize (13) over the powers under the constraints $w_k > 0$ and $$\sum_{k=1}^{K} w_k = W.$$

Fortunately, the following equivalent maximization problem is a convex optimization problem:

$$\max_{\substack{w_k>0, 1\leq k \leq K \\ \sum_{k=1}^{K} w_k = W_{tot}}} \sum_{k=1}^{K} \log\left(1 - F_k\left(\frac{2^{R_k}-1}{w_k}\right)\right). \quad (14)$$

The objective function in (14) can be shown to be a concave function of powers in the positive orthant while the constraint sets are readily seen to be convex. Hence a global optimum can be determined through numerical optimization.

Consider the outage probability obtained using the optimum decoder. For a given rate and power tuple R, w, and a channel realization $\tilde{H} = HW^{1/2}$ an outage occurs if the rate tuple lies outside the instantaneous capacity region. Thus the outage event is defined to be $$O = \bigcup_{\substack{\mathcal{J} \subseteq \{1,\ldots,K\} \\ \mathcal{J} \neq \phi}} \left\{\log|I + \tilde{H}^{\mathcal{J}}(\tilde{H}^{\mathcal{J}})^{\dagger}| < \sum_{j \in \mathcal{J}} R_j\right\}, \quad (15)$$

where the matrix $\tilde{H}^{\mathcal{J}}$ is formed by columns of $\tilde{H}$ with indices in the non-empty subset J.

Next, consider a power optimization problem for the fading multiple access channel which can be solved using the gradient based stochastic approximation (SA) method. Suppose we are given a rate-tuple R>0 and a sum power W>0. The objective is to determine the optimal power tuple which minimizes the joint outage probability subject to the sum power constraint. In particular, we wish to solve $$\min_{\substack{w \in IR_+^K \\ \sum_{k=1}^{K} w_k \leq W}} Pr(O) \quad (16)$$

Note that a closed form expression for Pr(O) is in general not available but as shown subsequently the gradient can be estimated which makes (16) well suited for gradient-based SA methods. Moreover we will also show that a good initial point can be determined via a deterministic convex optimization problem.

We first note that since Pr(O) is monotonic in each $w_k$, the optimal solution must lie on the boundary. Also we can restrict the search to the region $\{w_k \geq \epsilon\}_{k=1}^{K}$, $$\sum_{k=1}^{K} w_k = W.$$

This does not result in any loss of optimality if $\epsilon > 0$ is sufficiently small since R>0 and will be useful in ensuring regularity. Substituting $$w_K = W - \sum_{k=1}^{K-1} w_k,$$

we obtain the optimization problem to be $$\min_{\substack{\{w_k \geq \epsilon\}_{k=1}^{K-1} \\ \sum_{k=1}^{K-1} w_k \leq W-\epsilon}} E_{\tilde{H}}\left[\chi\left(\bigcup_{\mathcal{J} \neq \phi} \left\{\log|I + \tilde{H}^{\mathcal{J}}(\tilde{H}^{\mathcal{J}})^{\dagger}| < \sum_{j \in \mathcal{J}} R_j\right\}\right)\right] = \min_{\substack{\{w_k \geq \epsilon\}_{k=1}^{K-1} \\ \sum_{k=1}^{K-1} w_k \leq W-\epsilon}} \int_{\mathbb{C}^{NK}} \chi\left(\bigcup_{\mathcal{J} \neq \phi}\left\{\log|I + [a_j]_{j \in \mathcal{J}}([a_j]_{j \in \mathcal{J}})^{\dagger}| < \sum_{j \in \mathcal{J}} R_j\right\}\right) \times \left(\prod_{j=1}^{K-1} \frac{1}{\pi^N w_j^N} \exp\left(-\frac{\|a_j\|^2}{w_j}\right)\right) \frac{1}{\pi^N \left(W - \sum_{j=1}^{K-1} w_j\right)^N} \exp\left(-\frac{\|a_j\|^2}{W - \sum_{j=1}^{K-1} w_j}\right) da_1 \cdots da_K \quad (17)$$

where X(.) denotes the indicator function. Using (17) the partial derivatives of the objective function can be computed as $$\frac{\partial}{\partial w_k} E_{\tilde{H}}\left[\chi\left(\bigcup_{\mathcal{J} \neq \phi}\left\{\log|I + \tilde{H}^{\mathcal{J}}(\tilde{H}^{\mathcal{J}})^{\dagger}| < \sum_{j \in \mathcal{J}} R_j\right\}\right)\right] = \int_{\mathbb{C}^{NK}} \chi\left(\bigcup_{\mathcal{J} \neq \phi}\left\{\log|I + [a_j]_{j \in \mathcal{J}}([a_j]_{j \in \mathcal{J}})^{\dagger}| < \sum_{j \in \mathcal{J}} R_j\right\}\right)\left(\prod_{j=1}^{K-1} \frac{1}{\pi^N w_j^N}\exp\left(-\frac{\|a_j\|^2}{w_j}\right)\right) \times \frac{1}{\pi^N\left(W - \sum_{j=1}^{K-1} w_j\right)^N}\exp\left(-\frac{\|a_j\|^2}{W-\sum_{j=1}^{K-1} w_j}\right) \times \left(\frac{\|a_k\|^2 - N w_k}{w_k^2} + \frac{N\left(W - \sum_{j=1}^{K-1} w_j\right) - \|a_K\|^2}{\left(W - \sum_{j=1}^{K-1} w_j\right)^2}\right) da_1 \cdots da_K$$

$1 \leq k \leq K-1$

The exchange of the derivative and the integral can be rigorously verified. Note that due to the form of the derivative in (17), an unbiased estimate of it can be obtained via the score function method. Moreover the constraint set is compact and convex so the projection onto the set is well defined. Accordingly, this can be solved using a gradient-based stochastic approximation technique, as discussed in co-pending commonly-assigned U.S. patent application Ser. No. 10/898,917, entitled "Optimized Rate Space-Time Codes for Wireless Communication," filed on Jul. 26, 2004, the contents of which are incorporated by reference herein.

A good initial point can be obtained as follows. We first lower bound the outage probability by retaining only single user outage events. Then using the fact that the columns of $\tilde{H}$, $\{\|\tilde{h}_k\|^2\}_{k=1}^K$ are independent chi-square variables with $2N$ degrees of freedom each, we have $$Pr(O) \geq 1 - \prod_{k=1}^{K}\left(1 - F_k\left(\frac{2^{R_k}-1}{w_k}\right)\right) \quad (18)$$

where $$F_N(x) = 1 - \exp(-x)\sum_{k=0}^{N-1}\frac{x^k}{k!}.$$

The lower bound in (18) can be minimized to obtain a good initial point for our problem in (17). Moreover the minimization of the lower bound is equivalent to the following concave maximization problem.

$$\max_{\substack{w_k>0, 1\leq k\leq K \\ \sum_{k=1}^K w_k = W}} \sum_{k=1}^{K}\log\left(1 - F_k\left(\frac{2^{R_k}-1}{w_k}\right)\right). \quad (19)$$

Next in order to obtain Pr(O) yielded by the GD-DFD, proceeding as before we invoke the fact that the FEP yielded by the GD-DFD and its genie-aided counterpart are identical. We consider the genie-aided decoder and define $O_{G_k}$, the event that the group $G_k$ is in outage, as, $$O_{G_k} = \bigcup_{\substack{\mathcal{J}\subseteq G_k \\ \mathcal{J}\neq\phi}}\left\{\log\left|I + (\tilde{H}_{G_k}^{\mathcal{J}})^\dagger \tilde{P}_{G_k^\perp}\tilde{H}_{G_k}^{\mathcal{J}}\right| < \sum_{j\in\mathcal{J}}R_j\right\}, \quad (20)$$

$$1 \leq k \leq p.$$

The resulting outage probability is given by, $$Pr(O) = Pr(\cup_{k=1}^{p} O_{G_k}). \quad (21)$$

Moreover, for a fixed partition, using the fact that the matrices $\{(\tilde{H}_{G_k})^{554}\tilde{P}_{G_k^\perp}\tilde{H}_{G_k}\}_{k=1}^P$ are independent, the outage probability of the GD-DFD can be simplified to $Pr(O) = 1 - \Pi_{k=1}^{p}(1-Pr(O_{G_k}))$.

Deriving the outage probability of the GM-DFD is a challenging problem due to the presence of MAI. However, a useful upper bound can be obtained by assuming that the all elements of X in (2) are i.i.d $CN(0, 1)$. Invoking the fact that the FEP yielded by the GM-DFD and its genie-aided counterpart are identical, we consider the genie-aided decoder and define $O_{G_k}$, the event that the group $G_k$ is in outage, as, $$O_{G_k} = \bigcup_{\substack{\mathcal{J}\subseteq G_k \\ \mathcal{J}\neq\phi}}\left\{\log\left|I + (\tilde{H}_{G_k}^{\mathcal{J}})^\dagger (I + \tilde{H}_{G_{\bar{k}}}(\tilde{H}_{G_{\bar{k}}})^\dagger)^{-1}\tilde{H}_{G_k}^{\mathcal{J}}\right| < \sum_{k\in\mathcal{J}}R_k\right\} \quad (22)$$

and (21) yields the corresponding outage probability. The achievability of Pr(O) for both GD-DFD and GM-DFD can be proved via random coding arguments.

First, consider the GD-DFD where the partition is allowed to now depend on the channel realization. Then we define the group metric for $G_k$ to be $$\mathcal{M}_{G_k} = \min_{\substack{\mathcal{J}\subseteq G_k \\ \mathcal{J}\neq\phi}}\left\{\frac{\log\left|I + (\tilde{H}_{G_k}^{\mathcal{J}})^\dagger \tilde{P}_{G_{\bar{k}}^\perp}\tilde{H}_{G_k}^{\mathcal{J}}\right|}{\sum_{k\in\mathcal{J}}R_k}\right\} \quad (23)$$

where $\tilde{H}_{G_k}^{\mathcal{J}}$ is formed by the columns of $\tilde{H}$ in the set J. Further the outage event can now be written as $$O = \left\{\min_{1\leq k\leq p}\{\mathcal{M}_{G_k}\} < 1\right\} \quad (24)$$

Let P denote the set of all partitions of $\{1, \ldots, K\}$ into disjoint non-empty groups (subsets) each of size no greater than $|G|_{max}$. After some work, the cardinality of P, denoted by $|P|$ can be determined as $$\sum_{\substack{\{b_i \in \mathbb{Z}_+\}_{i=1}^{|G|_{max}} \\ \sum_{i=1}^{|G|_{max}} ib_i = K}} \frac{\left(\sum_{i=1}^{|G|_{max}} b_i\right)! K!}{b_1! \cdots b_{|G|_{max}}!(1!)^{b_1}\cdots(|G|_{max}!)^{b_{|G|_{max}}}} \quad (25)$$

Defining $$q \triangleq \left\lceil\frac{K}{|G|_{max}}\right\rceil,$$

we can also upper bound $|P|$ as $$|\mathcal{P}| \leq \sum_{m=q}^{K} m!\left\{{K \atop m}\right\}, \quad (26)$$

where $\left\{{K \atop m}\right\}$ denotes the Stirling number of the second kind and is given by the formula $$\left\{ {K \atop m} \right\} = \frac{1}{m!} \sum_{i=0}^{m-1} (-1)^i \binom{m}{i} (m-i)^K. \tag{27}$$

From (24) it is evident that the grouping rule which for each channel realization returns the partition, $$\{\hat{G}_1, \ldots, \hat{G}_{\hat{p}}\} = \arg \max_{\{G_1,\ldots,G_p\} \in \mathcal{P}} \left\{ \min_{1 \le k \le p} \{\mathcal{M}_{G_k}\} \right\} \tag{28}$$

also minimizes the outage probability. Remarkably a brute-force search over P can be avoided and the optimal partition for each realization can be determined via the greedy strategy depicted in FIG. 2. Note that the outage probability yielded by the grouping rule can be obtained through Monte-Carlo simulations.

For the GM-DFD, assuming independent complex normal inputs, we can define the group metric as, $$\mathcal{M}_{G_k} = \min_{\substack{\mathcal{J} \subseteq G_k \\ \mathcal{J} \ne \phi}} \left\{ \frac{\log \left| I + (\tilde{H}_{G_k}^{\mathcal{J}})^\dagger \left( I + \tilde{H}_{G_{\bar{k}}} (\tilde{H}_{G_{\bar{k}}})^\dagger \right)^{-1} \tilde{H}_{G_k}^{\mathcal{J}} \right|}{\sum_{k \in \mathcal{J}} R_k} \right\} \tag{29}$$

and the outage event can now be written as in (24). Moreover, the greedy strategy outlined above (albeit now using the metric in (29) is evidently optimal. Note that the complexity of the greedy strategy is $O(K^{|G|_{max}+1})$ and since it is performed once at the start of each block, this added cost is negligible.

Power optimization problems for both the GD-DFD and the GM-DFD with or without optimal grouping can be solved via the gradient-based SA method. The only change we have to make is the replace X(.) with the indicator functions of the corresponding outage events.

Group Decoders without Feedback. Consider the group decorrelating (GD) and group MMSE (GM) decoders which do not involve feedback. We first describe the GM decoder and provide an optimal grouping strategy for it (the GD decoder along with its optimal grouping follows after minor changes). For a given partition $\{G_1, \ldots, G_p\}$ of $\{1, \ldots, K\}$ let $\tilde{H}_{G_{\bar{k}}} = [\tilde{H}_{G_j}]_{j \ne k}$, $1 \le k \le p$. Defining $$\hat{Q}_{G_k} \triangleq (\tilde{H}_{G_k})^\dagger \left( I + \tilde{H}_{G_{\bar{k}}} (\tilde{H}_{G_{\bar{k}}})^\dagger \right)^{-1} \tilde{H}_{G_k} \tag{30}$$

$$\hat{F}_{G_k} \triangleq (\hat{Q}_{G_k})^{-1/2} (\tilde{H}_{G_k})^\dagger \left( I + \tilde{H}_{G_{\bar{k}}} (\tilde{H}_{G_{\bar{k}}})^\dagger \right)^{-1}, \quad 1 \le k \le p,$$

the soft statistics for $G_k$ are given by $$\hat{F}_{G_k} Y = \hat{F}_{G_k} \tilde{H}_{G_k} X_{G_k} + \hat{F}_{G_k} \left( \sum_{j \ne k} \tilde{H}_{G_j} X_{G_j} + V \right) \tag{31}$$

The users in $G_k$ are decoded using the optimum decoder on (31). Note that as opposed to the GM-DFD, all groups are decoded in parallel which makes this decoder more suitable for systems with stringent delay constraints.

We next describe an optimal grouping strategy under a maximum group size constraint. With group size equal to one, the GM decoder reduces to the well-studied linear MMSE decoder. Clearly since all groups are decoded in parallel, the ordering issue does not arise. However, with group size greater than one there is room to optimize over group compositions. First, assuming i.i.d. complex normal inputs we can define the group metric for $G_k$ to be, $$\mathcal{M}_{G_k} = \min_{\substack{\mathcal{J} \subseteq G_k \\ \mathcal{J} \ne \phi}} \left\{ \frac{\log \left| I + (\tilde{H}_{G_k}^{\mathcal{J}})^\dagger \left( I + \tilde{H}_{G_{\bar{k}}} (\tilde{H}_{G_{\bar{k}}})^\dagger \right)^{-1} \tilde{H}_{G_k}^{\mathcal{J}} \right|}{\sum_{k \in \mathcal{J}} R_k} \right\} \tag{32}$$

so that the outage event is given by (24). Note that since there is no ordering (i.e. $\mathcal{M}_{G_k}$, $1 \le k \le p$ is invariant to the p! permutations of $G_1, \ldots, G_p$) the set of partitions (satisfying the group size constraint) of interest, denoted by $\mathcal{P}$ has cardinality, $$\sum_{\substack{\{b_i \in Z_+\}_{i=1}^{|G|_{max}} \\ \sum_{i=1}^{|G|_{max}} i b_i = K}} \frac{K!}{b_1! \cdots b_{|G|_{max}}! (1!)^{b_1} \cdots (|G|_{max}!)^{b_{|G|_{max}}}} \tag{33}$$

Clearly the strategy $$\{\hat{G}_1, \ldots, \hat{G}_{\hat{p}}\} = \arg \max_{\{G_1,\ldots,G_p\} \in \mathcal{P}} \left\{ \min_{1 \le k \le p} \{\mathcal{M}_{G_k}\} \right\} \tag{34}$$

is sufficient to minimize the outage probability. Unfortunately it is not known if a greedy algorithm is optimal so we consider another grouping strategy which is optimal w.r.t the outage probability but does not have the additional max-min optimality of (34). Specifically, we suggest the rule $$\{\hat{G}_1, \ldots, \hat{G}_{\hat{p}}\} = \arg \max_{\{G_1,\ldots,G_p\} \in \hat{\mathcal{P}}} \left\{ \min_{1 \le k \le p} \{\mathcal{M}_{G_k}\} \right\} \tag{35}$$

where $\hat{\mathcal{P}} \subset \mathcal{P}$ is a reduced set of partitions formed by retaining only those partitions from $\mathcal{P}$ in which groups (or subsets) cannot be combined without violating the group size constraint. It is proved in the Appendix that the rules of (34) and (35) yield the same outage probability.

While exemplary drawings and specific embodiments of the present invention have been described and illustrated, it is to be understood that that the scope of the present invention is not to be limited to the particular embodiments discussed. Thus, the embodiments shall be regarded as illustrative rather than restrictive, and it should be understood that variations may be made in those embodiments by workers skilled in the arts without departing from the scope of the present invention as set forth in the claims that follow and their structural and functional equivalents.

What is claimed is:

1. A method for mapping a given set of users with predetermined transmission rates and powers into an ordered partition for use in a multiple antenna receiver structure employing a successive group decoder and comprising:
   (i) selecting a group or subset from a set of users that maximizes a metric among all groups having a size less than a specified maximum group size when treating the remaining users as interferers;
   (ii) appending the selected group into an ordered partition and removing the users in the selected group from the set of users; and
   (iii) repeating steps (i) and (ii) until the set of users is empty;

the metric for a candidate group G of users when treating the users in the set S\G as interferers being based on $$M(G) = \min_{J \subseteq G} \frac{\log \left| I + (\tilde{H}^J)^* \left( I + \tilde{H}^{S \backslash G} (\tilde{H}^{S \backslash G})^* \right)^{-1} \tilde{H}^J \right|}{\sum_{k \in J} R_k}$$

where J is a subset of the set G, I is the identity matrix, $\tilde{H}^J$ includes channel realizations and transmit powers for users in the set J, $\tilde{H}^{S/G}$ includes the channel realizations and transmit powers for users in the set S\G, and $R_k$ is the specified rate of user k.

2. The method of claim 1 wherein the metric is responsive to a candidate group or subset of users, a set of interfering users, the rates assigned to the candidate group of users and the channel estimates and transmit powers corresponding to all users in the candidate group and the set of interfering users.

3. The method of claim 1 wherein the maximum group size parameter is fixed and provided as an input.

4. The method of claim 1 wherein the metric for a candidate group G of users when treating the users in the set S\G as interferers is given by $$M(G) = \min_{J \subseteq G} \left\{ \log \left| I + (\tilde{H}^J)^* \left( I + \tilde{H}^{S \backslash G} (\tilde{H}^{S \backslash G})^* \right)^{-1} \tilde{H}^J \right| - \sum_{k \in J} R_k \right\}.$$

5. The method of claim 1 wherein the maximum group size parameter is channel dependent.

6. The method of claim 5 wherein the maximum group size parameter cannot exceed a specified upper bound.

7. The method of claim 6 wherein the maximum group size parameter is chosen to be the smallest one that avoids an outage.

8. A method for mapping a given set of users with predetermined transmission rates and powers into a partition for use in a multiple antenna receiver structure employing a group decoder without feedback (parallel group decoder) and comprising:
   i. determining the metric of a partition as the minimum of the metrics of its constituent groups; and
   ii. selecting a partition that maximizes a metric among all partitions for whom none of their constituent groups can be combined without violating a specified maximum group size;

said metric for a group G of users when treating all the other users in the set $G^c$ as interferers being based on $$M(G) = \min_{J \subseteq G} \frac{\log \left| I + (\tilde{H}^J)^* \left( I + \tilde{H}^{G^c} (\tilde{H}^{G^c})^* \right)^{-1} \tilde{H}^J \right|}{\sum_{k \in J} R_k}.$$

where J is a subset of the set G, I is the identity matrix, $\tilde{H}^J$ includes the channel realizations and transmit powers for users in the set J, $\tilde{H}^{G^c}$ includes the channel realizations and transmit powers for users in the set $G^c$ and $R_k$ is the specified rate of user k.

9. The method of claim 8 wherein the metric for a candidate group G of users when treating all the other users in the set $G^c$ as interferers is given by $$M(G) = \min_{J \subseteq G} \left\{ \log \left| I + (\tilde{H}^J)^* \left( I + \tilde{H}^{S \backslash G} (\tilde{H}^{S \backslash G})^* \right)^{-1} \tilde{H}^J \right| - \sum_{k \in J} R_k \right\}.$$

* * * * *